United States Patent
Chuberre et al.

(10) Patent No.: US 7,333,770 B2
(45) Date of Patent: Feb. 19, 2008

(54) OPTIMISED DATA BROADCASTING DEVICE IN A TELECOMMUNICATION SYSTEM

(75) Inventors: Nicolas Chuberre, Tournefeuille (FR); Jean Farineau, Levallois Perret (FR)

(73) Assignee: Alcatel, Paris (FR)

(*) Notice: Subject to any disclaimer, the term of this patent is extended or adjusted under 35 U.S.C. 154(b) by 626 days.

(21) Appl. No.: 10/250,480

(22) PCT Filed: Jan. 3, 2002

(86) PCT No.: PCT/FR02/00013

§ 371 (c)(1),
(2), (4) Date: Jul. 2, 2003

(87) PCT Pub. No.: WO02/054668

PCT Pub. Date: Jul. 11, 2002

(65) Prior Publication Data

US 2004/0223459 A1 Nov. 11, 2004

(30) Foreign Application Priority Data

Jan. 4, 2001 (FR) .................................. 01 00078

(51) Int. Cl.
*H04B 7/185* (2006.01)

(52) U.S. Cl. .................... 455/13.1; 455/11.1; 370/486; 370/487

(58) Field of Classification Search ................ 455/427, 455/428, 433, 434, 439, 440, 461, 11.1, 13.1, 455/16; 370/400, 408, 486, 487
See application file for complete search history.

(56) References Cited

U.S. PATENT DOCUMENTS

| | | | | |
|---|---|---|---|---|
| 5,835,497 A | * | 11/1998 | Litzenberger et al. | 370/522 |
| 5,987,011 A | * | 11/1999 | Toh | 370/331 |
| 6,807,675 B1 | * | 10/2004 | Maillard et al. | 725/35 |
| 6,996,072 B1 | * | 2/2006 | Minborg | 370/260 |
| 2002/0021696 A1 | * | 2/2002 | Minborg | 370/392 |
| 2005/0008039 A1 | * | 1/2005 | Funaya et al. | 370/474 |

FOREIGN PATENT DOCUMENTS

EP    1 035 751 A2    9/2000
GB    2 345 158 A    6/2000

OTHER PUBLICATIONS

J. Aweya, "On the design of IP routers—Part 1: Router architectures", Journal of Systems Architecture, Elsevier Science Publishers BV, Amsterdam, NL, vol. 46, No. 6 Apr. 6, 2000, pp. 483-511, XP004190486.

* cited by examiner

*Primary Examiner*—Philip J. Sobutka
*Assistant Examiner*—Dominic E. Rego
(74) *Attorney, Agent, or Firm*—Sughrue Mion, PLLC

(57) ABSTRACT

The invention concerns a device for data broadcasting in an access network consisting of several interconnected nodes for transporting fluxes of information elements between content providers and reception terminals. The invention is characterised in that said device is implanted at least at one node of the network, and it comprises a circuit managing the profile of the node (8) configured by an operator of the network or of the node (4) on the basis of objective or even subjective criteria and a mechanism filtering (6) broadcast information elements which controls a switch (5) so as to filter said information elements.

18 Claims, 1 Drawing Sheet

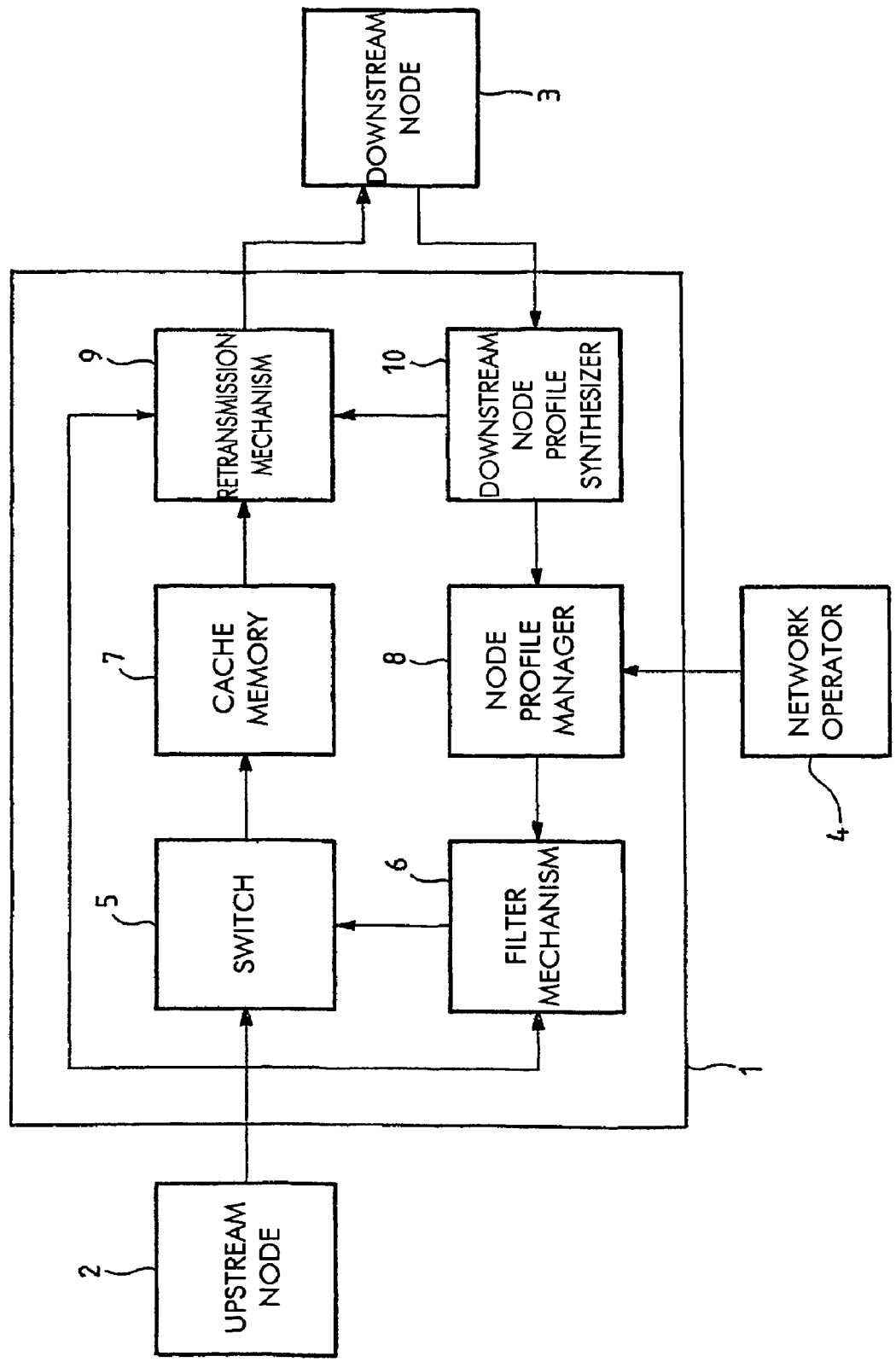

OPTIMISED DATA BROADCASTING DEVICE IN A TELECOMMUNICATION SYSTEM

BACKGROUND OF THE INVENTION

The present invention relates to a device for optimum broadcasting of information in a telecommunication system.

The field of the invention is that of multimedia telecommunication services. In particular, Internet access from mobiles is a prime potential application for a broadcast device according to the invention.

The invention is intended for broadcasters seeking to increase the effectiveness of their information campaign through improved targeting of the groups of persons concerned via a telecommunication network.

Until now, the broadcasting of information over a telecommunication network has conformed to specific techniques. These include the "pull" technique whereby a content provider makes information that it wishes to transmit available in a database. Customers access the information after finding out the address of the database. The address can be the subject matter of a conventional publicity campaign using posters, television, radio, or other databases belonging to other content providers. This technique is essentially used on the Internet. Pull techniques thus enable users to access the specific information they require and thereby to obtain good quality of access to the information. The information is inherently targeted since it results from a selection made by the user.

However, pull techniques are not suitable for broadcasting. They can be used only on condition that the user has been advised beforehand of the existence of the information made available on the network. Thus the broadcast audience is small, even if the percentage of the population interested in the transmission is large in proportion to the population as a whole.

Information can also be broadcast using "push" techniques. For a content provider, this consists in broadcasting widely the information that it wishes to transmit. Customers then access the broadcast information via appropriate receivers, either free of charge or subject to a payment. Radio and television are excellent examples of the applications of push information broadcasting techniques. Although push techniques minimize bandwidth occupation compared to pull techniques, the same information generally being conveyed only once to a given node of the network, the quality of the information made available to users is very poor compared to that obtained with pull techniques. The information transmitted corresponds to an a priori targeting of the fields of interest of users and a person receiving information via this kind of communication channel is faced with a large amount of information that is not necessarily of interest to him.

Selection devices for specifying their fields of interest have therefore been made available to users. International patent application WO 00/23864 relates to a device of this type intended for use by advertising agencies and enabling them to send information to customers for whom they have a specification defining a respective individual profile. However, this device necessitates knowing the users to whom the information is broadcast beforehand.

The arrival of the mobile Internet and future generation mobile radio networks, including satellite mobile radio systems, necessitate the installation of mechanisms for broadcasting information that offer high performance.

SUMMARY OF THE INVENTION

Accordingly, the problem that the invention aims to solve is that of providing a device for broadcasting information enabling advertisers to direct information for which they are responsible to the most receptive population segment, whilst alleviating the drawback of the prior art broadcasting techniques. In particular, the device according to the invention is intended to be more efficient, in terms of bandwidth, and in terms of the ratio of the interested population to the population as a whole.

To this end, to optimize the broadcasting of information, the invention takes into account the profiles of users, to orient the broadcasting of information to users whose profile corresponds more closely to that of the target population, and also takes into account the load on the network, to minimize the cost of transmitting the information.

Accordingly, with a view to simple filtering on reception, information items to be broadcast are associated with broadcast criteria and with routing constraints.

Filtering is therefore effected on the basis of objective criteria such as geographical location, climate, language, etc. Filtering can be based on subjective criteria such as professional situation, leisure activities, user's interests, etc.

These criteria are established by synthesizing profiles of users connected to the network output node. Accordingly, in some cases, subjective criteria can become objective criteria temporarily. This applies in particular in the situation where each user connected to the output node of the network has the same characteristic corresponding to a subjective criterion.

Moreover, in a broadcasting device according to the invention, the provision of cache memory at certain nodes of the network enables optimum exploitation of gaps in the load on the network.

The invention therefore concerns a device for broadcasting information in an access network consisting of a plurality of interconnected nodes for conveying streams of information items between content providers and receiver terminals, characterized in that said device is installed in one or more network nodes and comprises a node profile management circuit configured by an operator of the network or an operator of the node as a function of objective or even subjective criteria and a mechanism for filtering broadcast information items that controls a switch to filter said information items.

Another feature of the device is that it further comprises a mechanism for synthesizing downstream node profiles for automatically updating the node profile management circuit in which said broadcasting device is installed as a function of subjective criteria.

According to another feature, the device further comprises a cache memory for temporarily storing filtered information items and a mechanism for retransmitting said stored information items.

The device according to the invention is characterized in that it is applied to any type of access network.

Among other things, the device according to the invention is characterized in that it is applied to a mobile radio network access network.

The device can also be applied to a mobile radio network access network using a space segment.

BRIEF DESCRIPTION OF THE DRAWINGS

Other features and advantages of the invention will become more clearly apparent on reading the following description of one embodiment, which is given with reference to the accompanying drawing, in which:

FIG. 1 is a diagram illustrating the installation of the device in an access network node.

DETAILED DESCRIPTION OF THE INVENTION

Thus FIG. 1 shows the installation of a device according to the invention in an access network node which can be an input node, an output node, or an intermediate node of an access network.

An access network comprises a plurality of branches each consisting of a plurality of interconnected nodes. Thus the device can be installed in a plurality of branches of the access network and in a plurality of interconnected nodes of a branch of the access network. It is therefore considered that a device according to the invention is installed at one or more access network nodes.

In FIG. 1, the node 1 of the network in which the device for optimized broadcasting of information is installed is connected to another network node 2 on its upstream side and to one or more further network nodes 3 on its downstream side. The operator 4 has the option of connecting management equipment to the node 1 for configuring or analyzing it.

The node 1 receives as input streams of information coming from the upstream node 2.

In one embodiment of the invention, a mechanism in the node 1 for synthesizing profiles of the downstream nodes 10 receives as input information concerning the profiles of the downstream nodes. It is nevertheless an option not to activate and not to install the synthesizer mechanism 10 in the node 1.

In this particular embodiment, the information concerning the profiles of the downstream nodes is fed back from the downstream node 3 to the node 1.

The mechanism 10 that synthesizes the profiles of the downstream nodes supplies its results to a circuit 8 for managing the node profiles, which circuit is also configured by the network operator 4. The node 1 in which the device is installed further comprises a filter mechanism 6 which receives as input the node profile established by the node profile management circuit 8 as well as broadcasting criteria and routing constraints associated with the information items in the streams of information.

The filter mechanism 6 controls a switch 5 for storing information items in a cache memory 7. A retransmission mechanism 9 is provided in the node 1 for retransmitting stored information items to the downstream node 3.

The retransmission mechanism 9 operates as a function of commands associated with the stream of information incoming to the node 1. The node 1 in which the device according to the invention is installed is therefore provided with a number of supplementary functions compared to a conventional access network node.

Accordingly, a broadcast device according to the invention can characterize the profile of the node. Characterization of the profile of the node is effected in particular by means of a circuit 8 for managing the node profile. The circuit 8 can be configured by the operator of the network 4 or by the operator of the node.

Moreover, in the FIG. 1 example, the profiles of the downstream nodes 3 are fed back to the network and processed in the mechanism for synthesizing the profiles of the downstream nodes.

The result of this processing is then supplied to the node profile management circuit 8. Automatic updating of the profile of the node can be envisaged when the profile of a downstream node integrates a variable component (typically subjective criteria).

The characterization of the profile of the node can therefore be updated in real time by the downstream node synthesizer device 10.

A broadcast device according to the invention can therefore apply filtering to streams of broadcast information in accordance with objective and possibly even subjective criteria.

The objective criteria include geographical position, surrounding activity area type, typical climate, majority language, the month of year, day of week, time of day, etc.

The above list of objective criteria used to filter the stream of information broadcast is given merely by way of example and is in no way limiting on the scope of the invention.

The subjective filtering criteria include, for example, civil and family status, profession, leisure activities, interests, etc. Once again, this list is in no way limiting on the invention and is provided merely by way of example.

Filtering of received information items in the node 1 is based on the comparison of the broadcasting criteria associated with the information items and the criteria of the profile of the node. In the case of a match, the information item is retained in the cache memory. Otherwise, the information item is discarded.

Information is therefore broadcast in a segmented manner in the form of information items. An information item deals with only one or a few subjects. For each subject treated, there is a header associated with the information item and specifying its broadcasting criteria and constraints in terms of the time delay in routing the information to users.

Each information item of a stream of information is therefore associated with information characterizing it. This includes in particular information specifying routing time-delay constraints and information for filtering the stream of information according to objective or even subjective criteria. As a minimum, the geographical broadcasting area can be specified, for example as a disk characterized by a center and a diameter.

The filter mechanism 6 therefore receives as input the criteria of the profile from the node profile management circuit 8 and the information associated with a given information item enabling it to be characterized.

Accordingly, when the profile of the node 1 as determined by the node profile management circuit 8 conforms to the broadcast criteria associated with an information item of an information stream incoming to the node 1, which criteria are contained in the headers of the information items, the filter mechanism 6 commands the switch 5 to retain the information item in memory. To this end, the node 1 is provided with a cache memory 7 for retaining some of the broadcast information. For example, every output node of the access network situated in the indicated geographical area must retain the broadcast information in its cache memory.

Finally, the device according to the invention further includes a mechanism 9 for retransmitting information items stored in the cache memory 7. The presence of the cache memory 7 in the node 1 of the network in which the device is installed has the advantage of enabling information to be broadcast during periods in which the load on the network is low.

Each information item broadcast is associated with information characterizing it, in particular information enabling filtering in accordance with objective or even subjective criteria, as explained above.

Each item in the stream of broadcast information items is also associated with retransmission commands specifying constraints in terms of the delay in routing; the information to the user terminals, for example a retransmission and/or routing time band, or even the repetition frequency of the broadcast, etc. The retransmission mechanism 9 therefore determines the type of retransmission as a function of the retransmission commands associated with the information items received.

Accordingly, the node of the network 1 in which the device is installed is provided with specific means for optimum broadcasting of news in the network to downstream nodes in its coverage area.

In another embodiment of the invention, a device for optimized broadcasting of information can be installed in one or more nodes of the access network without the cache memory 7 and without the retransmission mechanism 9. The device according to the invention then comprises only the node profile management circuit 8 configured by the operator of the network or the operator of the node 4 as a function of objective or even subjective criteria and the mechanism 6 for filtering broadcast information items that controls the switch 5 to filter the information items.

In this configuration, the device filters the received information items as a function of criteria of the profile of the node in which it is installed and then retransmits information items whose broadcasting criteria correspond to the criteria of the profile of the node directly to downstream nodes in the coverage area without taking account of periods in which the network load is low or of constraints associated with the delay in routing the information to users.

If the criteria for broadcasting an information item do not correspond to the criteria of the profile of the node, the filter mechanism 6 commands the switch 5 to discard the information item.

The device can nevertheless further include the mechanism 10 for synthesizing profiles of downstream nodes, to update the node profile management circuit 8 in which the device is installed automatically, as a function of subjective criteria.

If the device for optimized broadcasting of information is applied to an access network to mobile radio networks, the access network comprises two types of node, namely base station controller nodes and base station nodes.

A device according to the invention can be installed in a base station node, for example, i.e. a network output node. As shown in FIG. 1, the downstream node is then a user terminal and the upstream node is a base station controller.

The groups of users covered by one or more base stations in which a device according to the invention is used therefore have the benefit of programs adapted to what they require. The information items made available to them are perfectly targeted because they are based on the environment covered by the node concerned, or even synthesized characteristics related to the profiles of users connected to the node.

The device according to the invention can also be installed in a base station controller, i.e. in an access network input node. The downstream nodes then correspond to base stations and the upstream nodes correspond to nodes of the core network of the mobile radio network.

The device in accordance with the present invention for optimized broadcasting of information can also be applied to a satellite access network. A satellite access network consists mainly of three types of node: the satellite gateway, the satellite itself and finally the satellite terminal. Accordingly, the broadcasting device according to the invention can advantageously be installed in the satellite gateway so as to take account of the load on the capacity of the air interface of the space segment. In another embodiment, the device can be installed in the satellite or in the terminal.

The device for the optimized broadcasting of information can also be applied to an access network to mobile radio networks in which a satellite access network is inserted between the station controller and the base station or upstream of the base station controller, or downstream of the base station, in which case the satellite terminal and the mobile terminal can be one and the same. A space segment is therefore used. The device can then be installed in the base station controller, the satellite gateway, the satellite itself, the satellite terminal or the base station, at will. The device is preferably installed in the base station controller.

Generally speaking, the device can be installed in any type of access network.

The device according to the invention therefore optimizes the broadcasting of information since the information made available to users is perfectly targeted. The device necessitates modification of some nodes of the network by adding a filter device and possibly adding a device for temporarily storing streams of information as well as a retransmission device.

The invention claimed is:

1. A device for broadcasting information in an access network comprising a plurality of interconnected nodes configured for conveying streams of information items between information content providers and receiver terminals, characterized in that said device is installed in one or more network nodes and comprises a node profile management circuit configured by an operator of the network or an operator of the node as a function of objective or subjective criteria and a mechanism configured for filtering broadcast information items that controls a switch to filter said information items.

2. A broadcasting device according to claim 1, further comprising a mechanism configured for synthesizing downstream node profiles configured for automatically updating the node profile management circuit in which said broadcasting device is installed as a function of subjective criteria.

3. A broadcasting device according to claim 1, further comprising a cache memory configured for temporarily storing filtered information items and a mechanism configured for retransmitting said stored information items.

4. A broadcasting device according to claim 1, characterized in that it is applied to any type of access network.

5. A broadcasting device according to claim 1, characterized in that it is applied to a mobile radio network access network.

6. A broadcasting device according to claim 1, characterized in that it is applied to a mobile radio network access network using a space segment.

7. A broadcast network having a plurality of nodes, comprising:
   a node configured to receive input information streams from an upstream node and output processed information to a downstream node, said node comprising,
   a synthesizing mechanism that receives profile information about the downstream node, and is configured to synthesize said profile information and supply said synthesized information to a circuit configured to manage said profile information, a filter mechanism configured to receive said managed profile information from said circuit and broadcasting information and routing information associated with said input information streams, a switch, controlled by said filter mechanism, said switch configured to control transmission of information items of said upstream node for storage in a cache memory, and a retransmission mechanism configured to retransmit said stored information items to said downstream node as a function of commands associated with said input information streams.

8. The network of claim 7, wherein said circuit can be configured by a network operator or a node operator.

9. The network of claim 7, wherein said profile information is automatically updated when said profile information integrates a variable component.

10. The network of claim 7, wherein the profile information can be updated in real time by the synthesizer device.

11. The network of claim 7, wherein said filter mechanism filters said input information streams in accordance with at least one of subjective criteria and objective criteria, by comparing said broadcasting information with said managed profile information, and if a match occurs there between, said managed profile information is stored in said cache memory.

12. The network of claim 7, wherein said information items are broadcast, and each of said information items comprises a header that specifies broadcasting criteria of said information item, and constraints in terms of time delay.

13. The network of claim 7, wherein when the profile of said node as determined by said circuit conforms to the broadcast criteria associated with one of said information items of said an input information stream, the filter mechanism commands the switch to retain the information item in said cache memory.

14. The network of claim 7, wherein the cache memory is configured to enable information to be broadcast during periods in which the load on the network is low.

15. The network of claim 7, wherein each of said information items are associated with retransmission commands specifying constraints in terms of a routing delay, so as to determine the type of retransmission as a function of the retransmission commands associated with the information items.

16. A broadcast network having a plurality of nodes, comprising:

a node configured to receive input information streams from an upstream node and output processed information to a downstream node, said node comprising, a circuit configured to manage profile information of said downstream node, a filter mechanism configured to receive said managed profile information from said circuit and broadcasting information and routing information associated with said input information streams, and a switch, controlled by said filter mechanism, said switch configured to control retransmission of information items of said input information streams whose broadcasting criteria correspond to criteria of the profile of the downstream node.

17. The broadcast network of claim 16, wherein if broadcasting criteria of an information item does not correspond to the criteria of the profile of the downstream node, the filter mechanism commands the switch to discard the information item.

18. The broadcast network of claim 16, further comprising a synthesizing mechanism that receives profile information about the downstream node, and is configured to synthesize said profile information and supply said synthesized information to said circuit, and automatically update the circuit in which the device is installed as a function of subjective criteria.

* * * * *